US008727305B2

(12) United States Patent
Kanai (10) Patent No.: US 8,727,305 B2
(45) Date of Patent: May 20, 2014

(54) DIAPHRAGM VALVE (75) Inventor: Ryoji Kanai, Tokyo (JP)

(73) Assignee: Koganei Corporation, Tokyo (JP)

( * ) Notice: Subject to any disclaimer, the term of this patent is extended or adjusted under 35 U.S.C. 154(b) by 9 days.

(21) Appl. No.: 13/390,598

(22) PCT Filed: May 20, 2010

(86) PCT No.: PCT/JP2010/058561
§ 371 (c)(1),
(2), (4) Date: Feb. 15, 2012

(87) PCT Pub. No.: WO2011/021416
PCT Pub. Date: Feb. 24, 2011

(65) Prior Publication Data
US 2012/0138836 A1  Jun. 7, 2012

(30) Foreign Application Priority Data
Aug. 19, 2009  (JP) .................................. 2009-189892

(51) Int. Cl.
*F16K 31/00* (2006.01)
(52) U.S. Cl.
USPC .......................................... 251/62; 251/61.1
(58) Field of Classification Search
CPC ................................. F16K 1/123; F16K 1/126
USPC ........................... 251/61, 62, 61.1, 331, 335.2
See application file for complete search history.

(56) References Cited

U.S. PATENT DOCUMENTS

| | | | | |
|---|---|---|---|---|
| 2,016,997 A | * | 10/1935 | Hartke | 137/614.11 |
| 2,410,960 A | * | 11/1946 | Bunn | 137/468 |
| 2,416,787 A | * | 3/1947 | White | 251/151 |
| 3,253,608 A | * | 5/1966 | Davis | 137/220 |
| 3,521,662 A | * | 7/1970 | Bache | 137/269 |
| 3,534,763 A | * | 10/1970 | Lucardie | 137/219 |
| 3,552,422 A | * | 1/1971 | Michelson et al. | 137/329.1 |

(Continued)

FOREIGN PATENT DOCUMENTS

| | | |
|---|---|---|
| JP | S56-146163 | 11/1981 |
| JP | 03-069872 A | 3/1991 |

(Continued)

OTHER PUBLICATIONS

International Search Report from PCT/JP2010/05861, Jun. 15, 2010.

*Primary Examiner* — John K Fristoe, Jr.
*Assistant Examiner* — Umashankar Venkatesan
(74) *Attorney, Agent, or Firm* — MKG, LLC (57) ABSTRACT

A diaphragm valve is used to perform opening/closing operations to switch between a state where two flow paths 14a and 15a communicate with each other and a state where the flow paths 14a and 14b are blocked from communicating with each other. A diaphragm unit 31 which is disposed in a valve housing 13 has a hollow valve body 32 capable of being reciprocated in the axial direction, the diaphragm unit 31 is formed with a communication flow path 32a through which two flow paths 14a and 14b are communicated with each other. A first diaphragm 34 is provided to one end portion of a hollow valve body 32, and a second diaphragm 36 is provided to the other end of the hollow valve body 32, when the hollow valve body 32 is moved in its axial direction and abuts on a valve seat portion 42, the communication flow path 32a is closed.

8 Claims, 9 Drawing Sheets

(56) References Cited

U.S. PATENT DOCUMENTS

| | | | | |
|---|---|---|---|---|
| 3,633,608 | A | * | 1/1972 | Minkner et al. ............... 137/220 |
| 4,125,125 | A | * | 11/1978 | Ezekoye et al. .......... 137/315.07 |
| 4,137,933 | A | * | 2/1979 | Culpepper .................... 137/219 |
| 4,300,748 | A | * | 11/1981 | Kreeley ........................... 251/5 |
| 4,416,301 | A | * | 11/1983 | Brumm ......................... 137/220 |
| 6,328,277 | B1 | | 12/2001 | Hanada |
| 7,063,517 | B2 | * | 6/2006 | Towne et al. .................. 417/395 |
| 2002/0195581 | A1 | | 12/2002 | McCarty et al. |

FOREIGN PATENT DOCUMENTS

| | | |
|---|---|---|
| JP | H08135815 A | 5/1996 |
| JP | 09-217843 A | 8/1997 |
| JP | 2001041333 A | 2/2001 |
| JP | 2001208237 A | 8/2001 |
| JP | 2001221358 A | 8/2001 |
| JP | 2003186546 A | 7/2003 |
| JP | 4146535 B2 | 9/2008 |
| WO | 9427069 A1 | 11/1994 |

* cited by examiner

DIAPHRAGM VALVE

TECHNICAL FIELD

The present invention relates to a diaphragm valve which has a valve body provided with a diaphragm and which operates so as to open/close a flow path.

BACKGROUND

As an opening/closing control valve serving as a directional control valve for controlling a direction of flow of fluid, a flow path switching valve which supplies fluid to a fluid circuit and stops supplying, namely, a two-way valve, and a non-return valve which allows fluid to flow in one direction and prevents fluid from flowing in the other direction, namely, a check valve are known. As this opening/closing control valve, a diaphragm valve including a diaphragm as a valve body is known. As one example, a diaphragm opening/closing control valve is disclosed in Patent Documents 1 and 2, and a diaphragm non-return valve is disclosed in Patent Document 3.

When the opening/closing control valve having a diaphragm type valve body is used in a fluid circuit, it is possible to separate fluid flowing in the fluid circuit from a driving section for driving the valve body. Since this fluid can be separated from this driving section, in a fluid circuit, for example, for discharging chemical such as photoresist liquid from a nozzle, it is possible to prevent foreign material from flowing into the chemical from the driving section.

DISCLOSURE OF THE INVENTION

Problems to be Solved by the Invention

When the valve body of the opening/closing control valve is activated, the valve body moves in a communication flow path, so that it moves fluid in the communication flow path at the time of activating the valve body, for example, when the communication flow path is closed by moving the valve body toward a valve seat, the fluid flows reversely. Therefore, in the two-way valve described in Patent Document 1, a pressing member for opening/closing which deforms a center portion of a diaphragm and a supplemental pressing member which deforms a peripheral portion of the diaphragm are provided to a valve housing. When a valve port is opened/closed by the diaphragm, it prevents volume change in the communication flow path. However, when the valve port is opened/closed by the diaphragm, in order to cause the pressing member for opening/closing and the supplemental pressing member to deform two different portions of the diaphragm, it is necessary to incorporate two pistons into the valve housing to drive respective portions.

On the other hand, in a fluid control apparatus described in Patent Document 2, a diaphragm type valve body facing one end portion of a cylindrical body formed with a communication flow path and a diaphragm type volume-adjusting body facing the other end portion of the cylindrical body are arranged so as to be separated from each other. When the valve body is activated, the volume-adjusting body is driven by a coupling member arranged on the outside of a valve housing. With this, volume change of a valve chamber is offset by a volume-adjusting chamber at the time of activating the valve body, so that fluid is prevented from reversely flowing in the fluid circuit. However, it encounters such a problem that, in order to separate the valve body and the volume-adjusting body from each other and operate them independently, it is necessary to dispose the coupling member so as to cover the valve housing, so that it is impossible to downsize the fluid control apparatus. Furthermore, the complicated communication flow path leads to increased pressure loss of fluid.

An object of the present invention is to open/close the valve body without moving fluid in the fluid circuit.

Another object of the present invention is to downsize the diaphragm valve.

Still another object of the present invention is to suppress pressure loss, turbulence or the like in the communication flow path of the diaphragm valve.

Means for Solving the Problems

In a diaphragm valve according to the present invention, a valve body having a diaphragm is incorporated into a valve housing, the diaphragm valve performs opening and closing operations to switch between a state where a first flow path communicates with a second flow path and a state where a first flow path is blocked from communicating with a second flow path. The diaphragm valve comprising: a hollow valve body which is disposed so as to be capable of performing a reciprocating operation in an axial direction in the valve housing and which is formed with a communication flow path through which the first flow path and the second flow path communicate with each other; a first diaphragm which is provided to one end portion of the hollow valve body; and a second diaphragm which is provided to the other end of the hollow valve body and moved in synchronization with the first diaphragm via the hollow valve body, wherein by moving the hollow valve body in the axial direction, the hollow valve body abuts on a valve seat portion provided to the valve housing to close the communication flow path.

In the diaphragm valve according to the present invention, a valve seat block having the valve seat portion is provided to the valve housing. In the diaphragm valve according to the present invention, driving means for reciprocating the hollow valve body in the axial direction is provided to the valve housing. In the diaphragm valve according to the present invention, a reciprocating member which is provided to the valve housing so as to be capable of performing a reciprocating motion in the axial direction in parallel with a moving direction of the hollow valve body is coupled to the hollow valve body, and a piston which drives the reciprocating member with fluid pressure is provided in the valve housing.

In the diaphragm valve according to the present invention, the hollow valve body is provided with a biasing member which applies biasing force in a direction toward the valve seat portion, when an opening direction thrust applied to the first diaphragm by fluid in the first flow path is larger than a closing direction thrust as the sum of a biasing force of the biasing member and a thrust applied to the second diaphragm by the pressure of fluid in the second flow path, the hollow valve body is separated from the valve seat portion to open the communication flow path, and when the opening direction thrust is smaller than the closing direction thrust, the hollow valve body abuts on the valve seat portion to close the communication flow path.

In the diaphragm valve according to the present invention, an outer diameter of the second diaphragm is set to be larger than an outer diameter of the first diaphragm, when an opening direction thrust applied to the first diaphragm by fluid in the first flow path is larger than a closing direction thrust applied to the second diaphragm by fluid in the second flow path, the hollow valve body is separated from the valve seat portion to open the communication flow path, and when the opening direction thrust is smaller than the closing direction thrust, the hollow valve body abuts on the valve seat portion to close the communication flow path.

Effects of the Invention

According to the present invention, since the diaphragms are provided to the respective end portions of the hollow valve body formed with a communication flow path and the hollow valve body is suspended to be movable in an axial direction by the diaphragms in the valve housing, when the hollow valve body abuts on the valve seat portion, the communication flow path is closed, and when the hollow valve body is separated from the valve seat portion, the communication flow path is opened. When the hollow valve body opens/closes the communication flow path, the diaphragms provided to the end portions of the hollow valve body are elastically deformed in synchronization with each other, so that fluid in the diaphragm valve is prevented from changing in volume in response to movement of the hollow valve body for opening/closing. Therefore, it is possible to prevent fluid in the fluid circuit from being moved in response to movement of the hollow valve body for opening/closing. Since the communication flow path constitutes a linear passage with the hollow valve body, it is possible to prevent pressure loss or disturbance of fluid from occurring in the fluid circuit.

Since the diaphragms are provided to both end portions of the hollow valve body and the diaphragms are elastically deformed in synchronization with the hollow valve body, the diaphragm valve is directly driven by the hollow valve body. Therefore, it is possible to downsize the diaphragm valve.

BEST MODE FOR CARRYING OUT THE INVENTION

Hereinafter, embodiments of the present invention will be described in detail with reference to the drawings. Members common to each other are denoted by the same reference numerals.

A diaphragm valve 10a shown in FIGS. 1A, 1B, and 2 to 4 has a first housing body 11 and a second housing body 12 attached to the first housing body 11. A valve housing 13 is composed of the housing bodies 11 and 12 by fastening the housing bodies 11 and 12 with screw members in a state where the housing bodies 11 and 12 abut each other at their abutment faces. A first pipe 14 having a flow path 14a is attached to the first housing body 11, while a second pipe 15 having a flow path 15a is attached to the second housing body 12. The pipes 14 and 15 are attached to the respective housing bodies 11 and 12 in a state where the flow paths 14a and 15a are coaxially arranged so as to face each other.

Figure 1A:
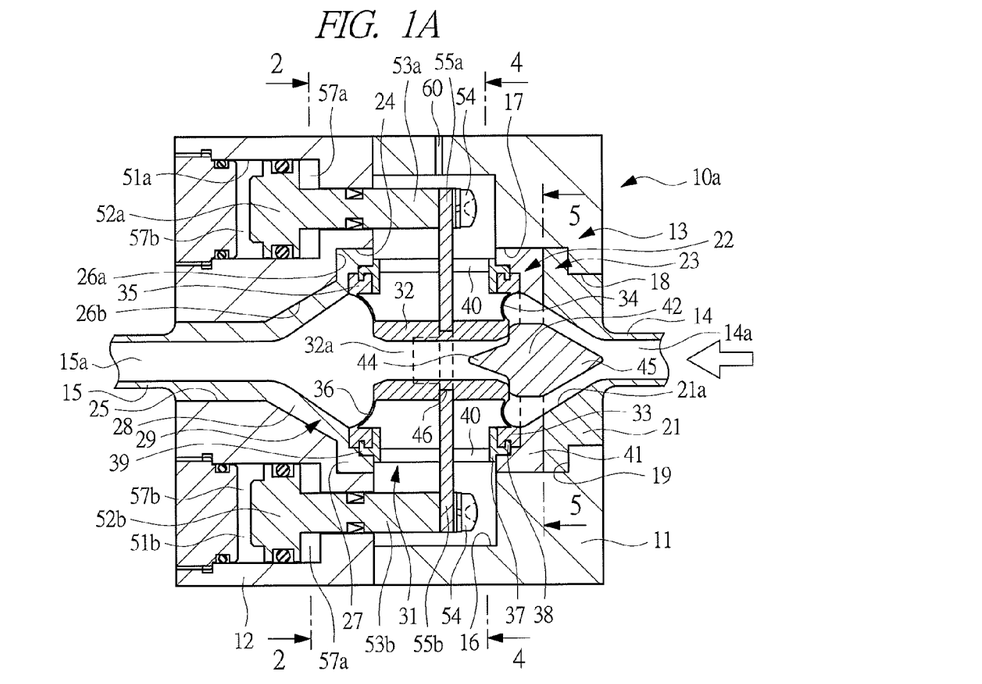
FIG. 1A is a sectional view showing a closed state of a flow path in a diaphragm valve according to one embodiment of the present invention.
Figure 1B:
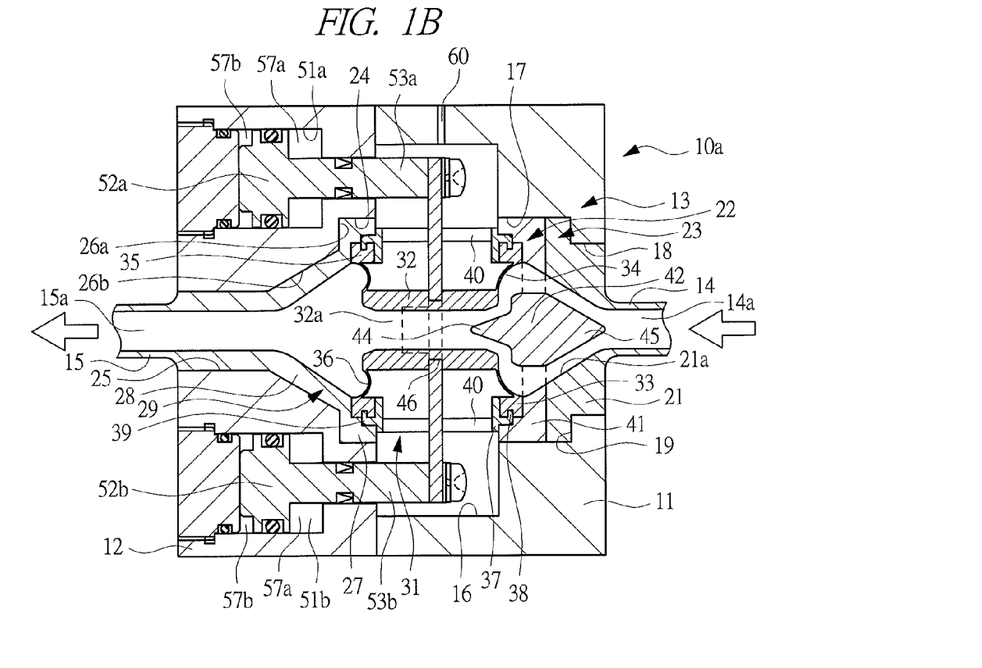
FIG. 1B is a sectional view showing an opened state of the flow path.

In the first housing body 11, a receiving concave portion 16 is formed on the abutment face side thereof, while it is formed with a large-diameter mounting hole 17 continuous to the receiving concave portion 16 and a small-diameter mounting hole 18 arranged coaxially with the large-diameter mounting hole 17. A flange portion 21 inserted into the mounting holes 17 and 18 is provided to an end portion of the first pipe 14, and the flange portion 21 is attached to the first housing body 11 in a state where it abuts on an abutment face 19 between the large-diameter mounting hole 17 and the small-diameter mounting hole 18. An inner face of the flange portion 21 is formed in such a taper face 21a that an inner diameter becomes larger toward the second housing body 12. A valve seat block 22 is attached to the mounting hole 17 of the first housing body 11, and the valve seat block 22 is positioned adjacent to the flange portion 21 constituting a joint member 23.

In the second housing body 12, a large-diameter mounting hole 24 is formed on its abutment face side, and a small-diameter mounting hole 25 is formed on the opposite side of the abutment face. Furthermore, an abutment face 26a allocated between the mounting holes 24 and 25 and a taper hole 26b continuous with this are formed in the second housing body 12. A flange portion 27 inserted into the large-diameter mounting hole 24 and a taper portion 28 corresponding to the taper hole 26b are provided to an end portion of the second pipe 15, and the flange portion 27 is attached to the housing body 12 in a state where the flange portion 27 abuts on the abutment face 26a. A second joint member 29 is composed of the flange portion 27 and the taper portion 28.

A diaphragm unit 31 is detachably disposed in the valve housing 13. The diaphragm unit 31 has a hollow valve body 32 formed with a communication flow path 32a causing the first flow path 14a and the second flow path 15a to communicate with each other, and the hollow valve body 32 is formed of a cylindrical member, namely, a sleeve-shaped member. A first diaphragm 34 in which an annular first mounting portion 33 is provided to an outer peripheral portion thereof is integrally provided to one end portion of the hollow valve body 32. A second diaphragm 36 in which an annular second mounting portion 35 is provided to an outer peripheral portion thereof is integrally provided to the other end portion of the hollow valve body 32. The first mounting portion 33 of the first diaphragm 34 is fixed to the valve housing 13 via the valve seat block 22, and the second mounting portion 35 for the second diaphragm 36 is fixed to the valve housing 13 via the flange portion 27.

Each of the first and second diaphragms 34 and 36 is curved and elastically deformed in synchronization with the hollow valve body 32 when the hollow valve body 32 is moved in an axial direction thereof. Thus, the hollow valve body 32 is in a state where it is hung and movably supported by the first and second diaphragms 34 and 36 integrally provided on the both end portions of the hollow valve body 32. Furthermore, the first and second diaphragms 34 and 36 are oppositely arranged so that their concave surfaces are directed outwardly in the axial direction of the hollow valve body 32.

Figure 6A:
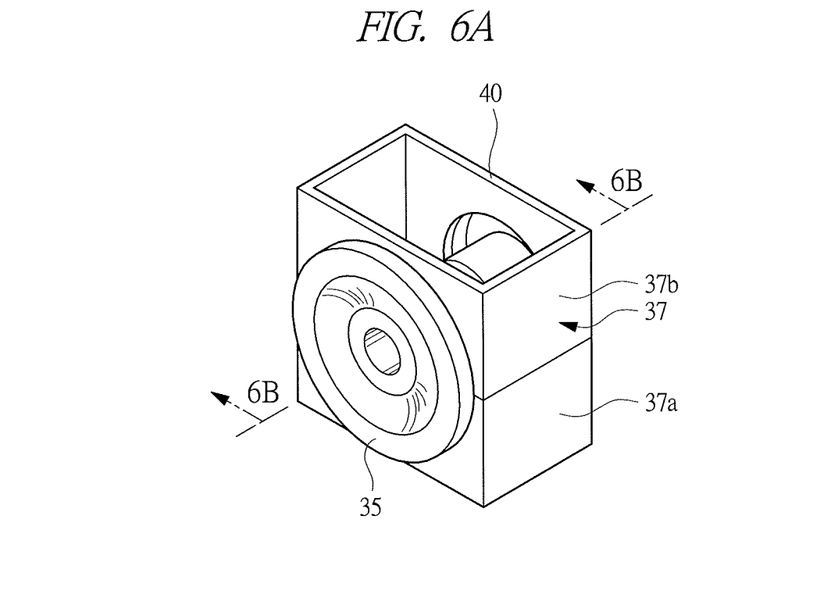
FIG. 6A is a perspective view showing a case in which a diaphragm unit shown in FIGS. 1A and 1B is accommodated.
Figure 6B:
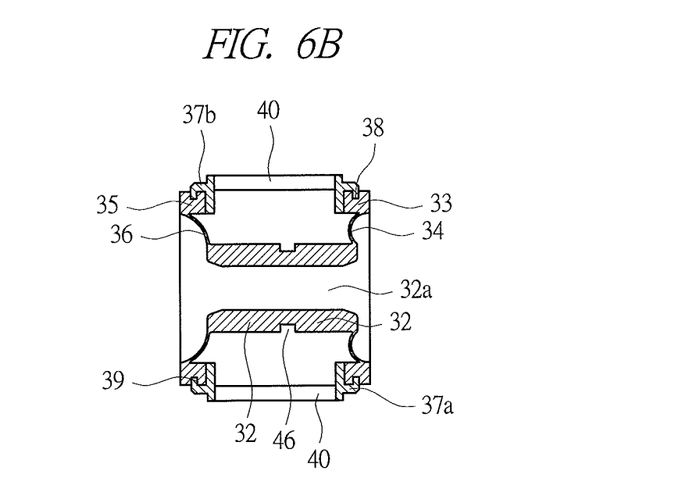
FIG. 6B is a sectional view taken along a line 6B-6B in FIG. 6A.

The diaphragm unit 31 is accommodated in a case 37. As shown in FIG. 6A, the case 37 has two case bodies 37a and 37b, and the case 37 is formed by causing the case bodies 37a and 37b to abut on each other. As shown in FIG. 6B, an engagement claw 38 engaged with an annular groove formed on an outer peripheral face of the first mounting portion 33 and an engagement claw 39 engaged with an annular groove formed on an outer peripheral face of the second mounting portion 35 are provided to the respective case bodies 37a and 37b. As shown in FIGS. 6A and 6B, opening portions 40 are formed on respective surfaces of the case bodies 37a and 37b.

The diaphragm unit 31 is accommodated in the case 37 by causing two case bodies 37a and 37b to abut on each other. The diaphragm unit 31 is attached in the valve housing 13 so as to take a floating state by fitting one end portion thereof in the valve seat block 22 and fitting the other end portion thereof in the flange portion 27. Although the diaphragm unit 31 is attached to the valve housing 13 via the valve seat block 22 and the flange portion 27 as described above, it may be directly attached to the valve housing 13. Furthermore, when the diaphragm unit 31 is replaced with another diaphragm unit, this replacement can be easily performed by detaching the case 37 from the valve housing 13.

Figure 5:
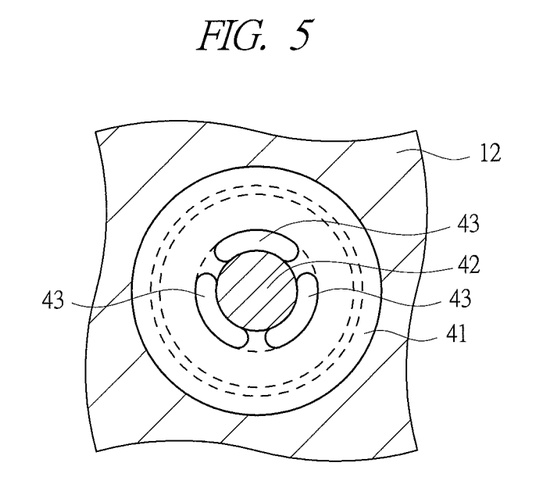
FIG. 5 is a sectional view taken along a line 5-5 in FIG. 1A.

As shown in FIGS. 1A and 1B, the valve seat block 22 has a circular base portion 41 which is fitted in the mounting hole 17, and a valve seat portion 42 which abuts on an end face of the hollow valve body 32 is provided on an inner face side of the base portion 41. As shown in FIG. 5, a plurality of through-holes 43 which extend through the base portion 41 are radially formed on the outside of the valve seat portion 42, and the flow path 14a and the communication flow path 32a communicate with each other via the through-holes 43. As shown in FIG. 5, each of the through-holes 43 is extended and formed into an arc shape. A conical projection 44 projecting into the communication flow path 32a of the hollow valve body 32 is provided to a radially center portion of the valve seat block 22, and a conical projection 45 projecting toward the flange portion 21 is provided on the opposite side of the projection 44.

As shown in FIG. 1A, when one end face of the hollow valve body 32 abuts on the valve seat portion 42, the communication flow path 32a of the hollow valve body 32 is closed, so that the first flow path 14a and the second flow path 15a take a blocked state. On the contrary, when the hollow valve body 32 is moved in the axial direction and the one end portion of the hollow valve body 32 is separated from the valve seat portion 42, as shown in FIG. 1B, the first flow path 14a and the second flow path 15a take a communicating state to communicate with each other via the communication flow path 32a.

When the first joint member 23 in the diaphragm valve 10a is defined as an inflow side joint member and the second joint member 29 is defined as an outflow side joint member, switching between a state where fluid such as liquid is supplied from the first flow path 14a serving as an inflow side flow path to the second flow path 15a serving as an outflow side flow path and a state where the supply of fluid is stopped is performed. In order to supply fluid from the first flow path 14a to the second flow path 15a, as shown in FIG. 1B, the hollow valve body 32 is separated from the valve seat portion 42. On the other hand, in order to stop the supply of fluid, as shown in FIG. 1A, the hollow valve body 32 is forced to abut on the valve seat portion 42. Thus, the diaphragm valve 10a is configured as a flow-passage switching valve to the state where fluid is supplied from the inflow side flow path to the outflow side flow path, and the state where the supply of fluid is stopped, namely, as a two-way valve.

When this diaphragm valve 10a is used, for example, in a fluid circuit for discharging chemical such as photoresist liquid from a nozzle, fluorine resin may be used as material of the joint members 23 and 29, the diaphragm unit 31, the valve seat block 22 and the like which come in contact with chemical. Therefore, a portion in contact with chemical can be prevented from being corroded by this chemical. Since the taper faces 21a are provided on the respective joint members 23 and 29 and the conical projections 44 and 45 are provided on the both sides of the valve seat block 22, fluid such as chemical flowing from the first flow path 14a to the second flow path 15a via the communication flow path 32a flows smoothly without staying. Incidentally, depending on the kind of liquid flowing in the flow paths, another resin other than the fluorine resin or metal may be used as the members which come in contact with the liquid.

When switching between the state where the flow path is closed by the movement of the hollow valve body 32 in the axial direction as shown in FIG. 1A, and the state where the flow path is opened as shown in FIG. 1B, is performed, since two diaphragms 34 and 36 are integrated with the hollow valve body 32, the movement of the hollow valve body 32 does not change a liquid volume between the joint members 23 and 29. That is, when the hollow valve body 32 is moved from the closing state to the opening state, the hollow valve body 32 put in the floating state by hanging performed by two diaphragms 34 and 36 is moved along liquid in the communication flow path 32a, and liquid pushed out by contraction deformation of the second diaphragm 36 comes around the inside of the first diaphragm expanding and deforming so that the liquid volume between the joint members 23 and 29 is not changed. When the hollow valve body 32 is moved from the opening state to the closing state, namely, a blocking state, similarly, the liquid volume is not changed. With this, even if the diaphragm valve 10a is moved for opening/closing, liquid in the fluid circuit provided with the diaphragm valve 10a does not move.

Since two diaphragms 34 and 36 are provided to both end portions of the hollow valve body 32 and directed in respective directions opposite to each other, the liquid volume does not change when the hollow valve body 32 is moved for opening/closing. In addition, since the valve body is constituted of the hollow valve body 32 and the diaphragms 34 and 36 are provided to both end portions of the hollow valve body 32 so as to be moved in synchronization with each other by the hollow valve body 32, it is possible to downsize the diaphragm valve 10a. Furthermore, since the communication flow path 32a of the hollow valve body 32 is formed into a straight shape, it is possible to eliminate pressure loss of fluid in the communication flow path 32a, and to prevent occurrence of turbulence.

Figure 4:
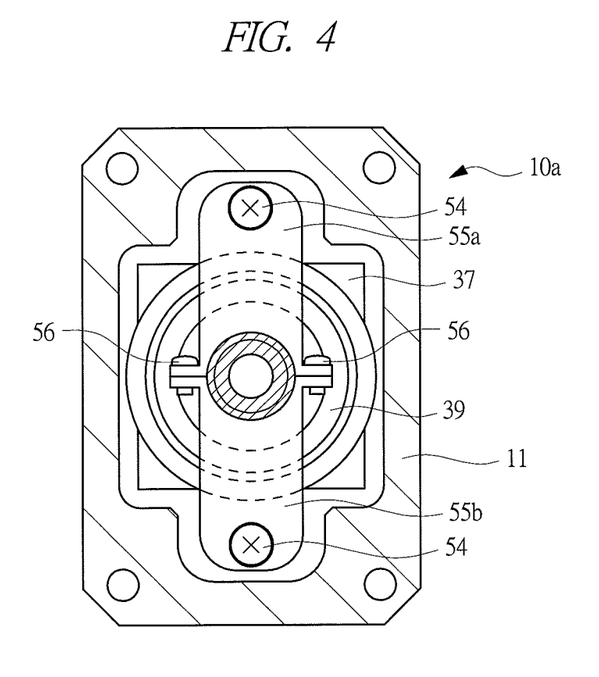
FIG. 4 is a sectional view taken along a line 4-4 in FIG. 1A.

In order to move the hollow valve body 32 to the opening position and the closing position, two cylinder chambers 51a and 51b are formed in the second housing body 12, and pistons 52a and 52b are mounted in the respective cylinder chambers 51a and 51b so as to be reciprocally movable in the axial direction. The pistons 52a and 52b are respectively provided with piston rods 53a and 53b serving as reciprocating members. A distal end of a coupling member 55a fixed to one piston rod 53a with a screw member 54 is engaged with an approximately half-arc portion of an annular groove 46 formed on an outer peripheral face of the hollow valve body 32. A distal end of a coupling member 55b fixed to the other piston rod 53b with a screw member 54 is engaged with the remaining approximately half-arc portion of the annular groove 46. As shown in FIG. 4, the coupling members 55a and 55b are coupled to each other with screw members 56, and the resultant force of two pistons 52a and 52b is applied to the center portion of the hollow valve body 32. However, it is possible to drive the hollow valve body 32 by one piston.

In the diaphragm valve 10a described above, each of the pistons 52a and 52b is a double-acting type piston, and forward and backward movements of the pistons 52a and 52b applying thrust to the hollow valve body 32 in the axial direction are performed by compressed air. However, each of the pistons 52a and 52b may be a single-acting type piston, one of the forward and backward movements may be performed by air pressure, and the other of the forward and backward movements may be performed by a spring. Furthermore, in the diaphragm valve 10a described above, the first pipe 14 is used as an inflow side pipe, and the second pipe 15 is used as an outflow side pipe. However, these pipes can be used in an opposite manner.

Figure 2:
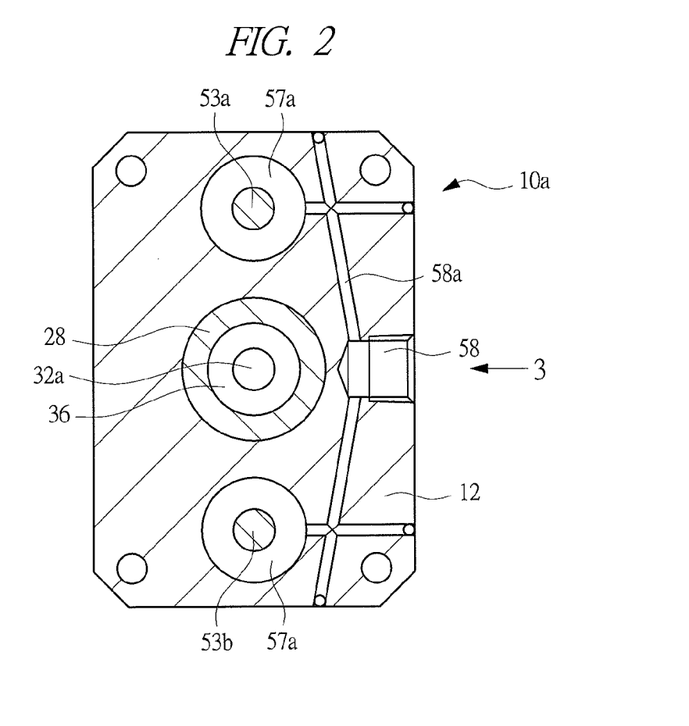
FIG. 2 is a sectional view taken along a line 2-2 in FIG. 1A.
Figure 3:
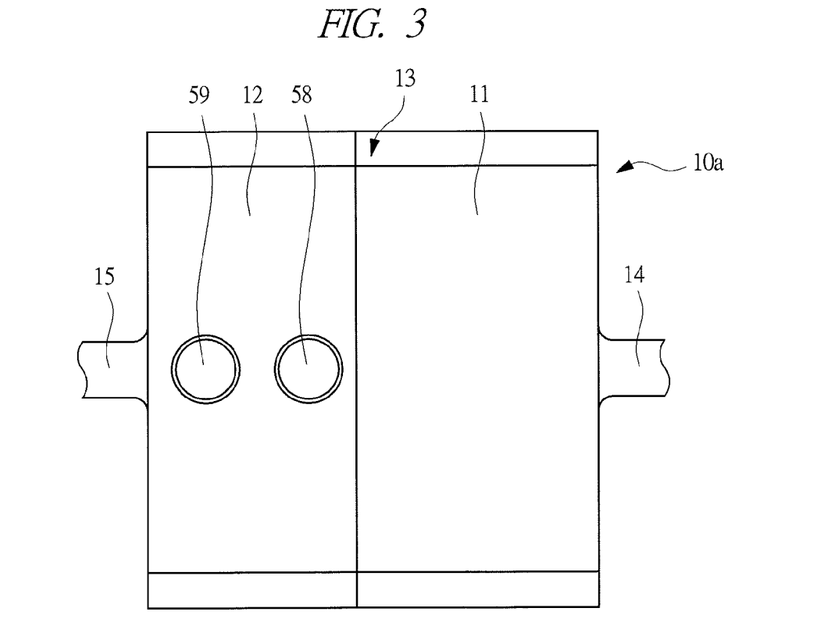
FIG. 3 is a side view seen from a direction of an arrow 3 in FIG. 2.

In order to allow the pistons 52a and 52b to be reciprocated by fluid pressure such as compressed air, as shown in FIGS. 2 and 3, a charging/discharging port 58 formed in the housing body 12 communicates with a pressure chamber 57a for backward movement via a flow path 58a. Similarly, a charging/discharging port 59 formed in the housing body 12 communicates with a pressure chamber 57b for forward movement via a flow path (not shown). Therefore, when compressed air is supplied to the charging/discharging port 59, the piston rods 53a and 53b are moved forward so as to project into the first housing body 11 so that the hollow valve body 32 is driven toward the valve seat portion 42. On the other hand, when compressed air is supplied to the charging/discharging port 58, the piston rods 53a and 53b are moved backward so that the hollow valve body 32 is driven in a direction away from the valve seat portion 42. When the piston rods 53a and 53b are reciprocated, air in the receiving concave portion 16 is charged/discharged via a breathing hole 60 formed in the housing body 12.

When the diaphragm valve 10a described above is used in a fluid circuit for discharging photoresist liquid from a nozzle, the first joint member 23 serves as the inflow side member for liquid, and the second joint member 29 serves as the outflow side member. When switching from the state where the communication flow path 32a is blocked due to abutting of the hollow valve body 32 on the valve seat portion 42, as shown in FIG. 1A, to the state where the communication flow path 32a is opened, as shown in FIG. 1B, compressed air is supplied from the charging/discharging port 58 to the pressure chamber 57a for backward movement, and air in the pressure chamber 57b for forward movement is discharged from the charging/discharging port 59 at this time. On the other hand, when the hollow valve body 32 is switched from the opened state to the blocked state, compressed air is supplied from the charging/discharging port 59 to the pressure chamber 57b for forward movement while air in the pressure chamber 57a for backward movement is discharged outside.

When the hollow valve body 32 is moved in the axial direction by the axial direction thrust the by the pistons 52a and 52b, since the diaphragms 34 and 36 are integrally provided on the respective end portions of the hollow valve body 32, the liquid volume does not change in the diaphragm valve 10a when the hollow valve body 32 is moved for opening/closing. In this way, since liquid in the fluid circuit provided with the diaphragm valve 10a does not move when the hollow valve body 32 is moved for opening/closing, it is possible to suppress pressure loss and turbulence in the communication flow path 32a. For example, when liquid is discharged from a nozzle, it is possible to discharge the liquid with a high precision and to suppress bubble generation in the liquid.

Figure 7:
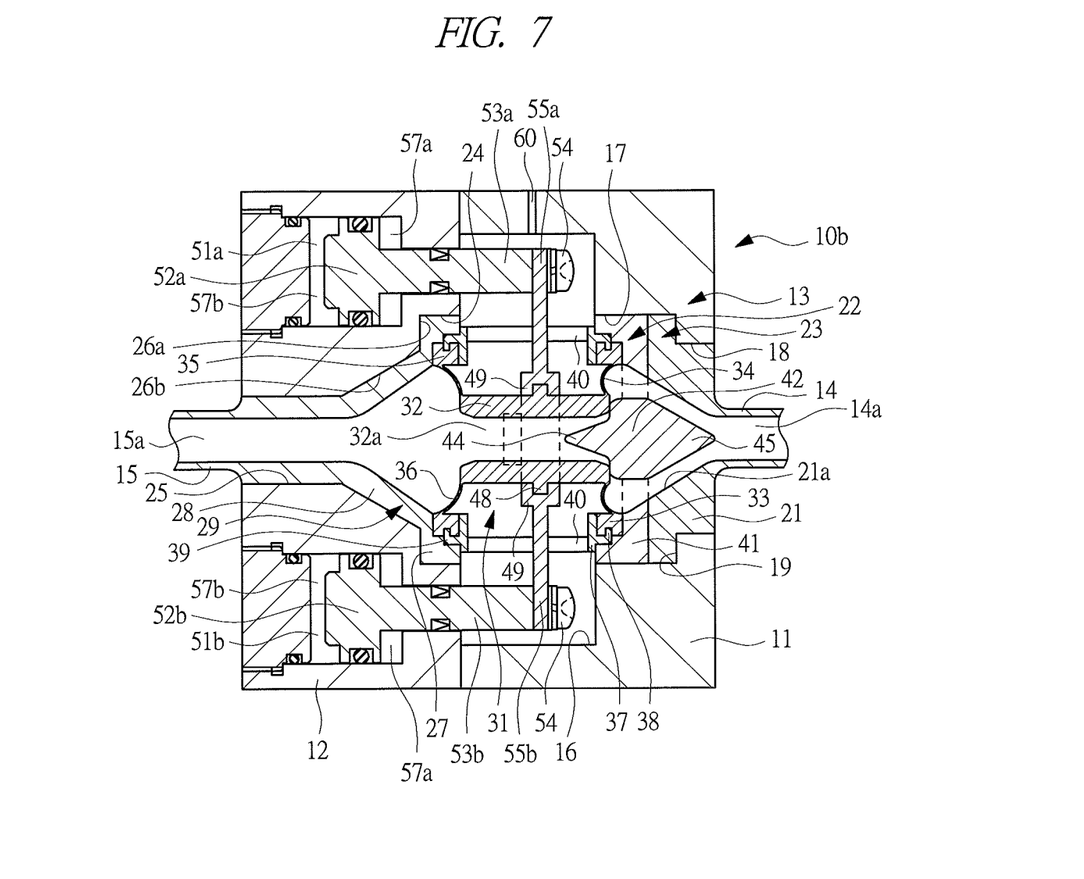
FIG. 7 is a sectional view showing a diaphragm valve according to another embodiment of the present invention.

FIG. 7 is a sectional view showing a diaphragm valve 10b according to another embodiment of the present invention, and a basic structure of this diaphragm valve 10b is the same as that of the above described diaphragm valve 10a.

While the hollow valve body 32 of the diaphragm valve 10a is formed with an annular groove 46 which is engaged with the distal ends of the coupling members 55a and 55b, a hollow valve body 32 of this diaphragm valve 10b is provided with an annular projection 48. Arc-shaped coupling end portions 49 having concave portions engaged with the annular projection 48 are provided to respective distal end portions of the coupling members 55a and 55b. In the diaphragm valve 10b of this type, the diaphragm unit 31 can be detachably mounted on the valve housing 13.

Figure 8A:
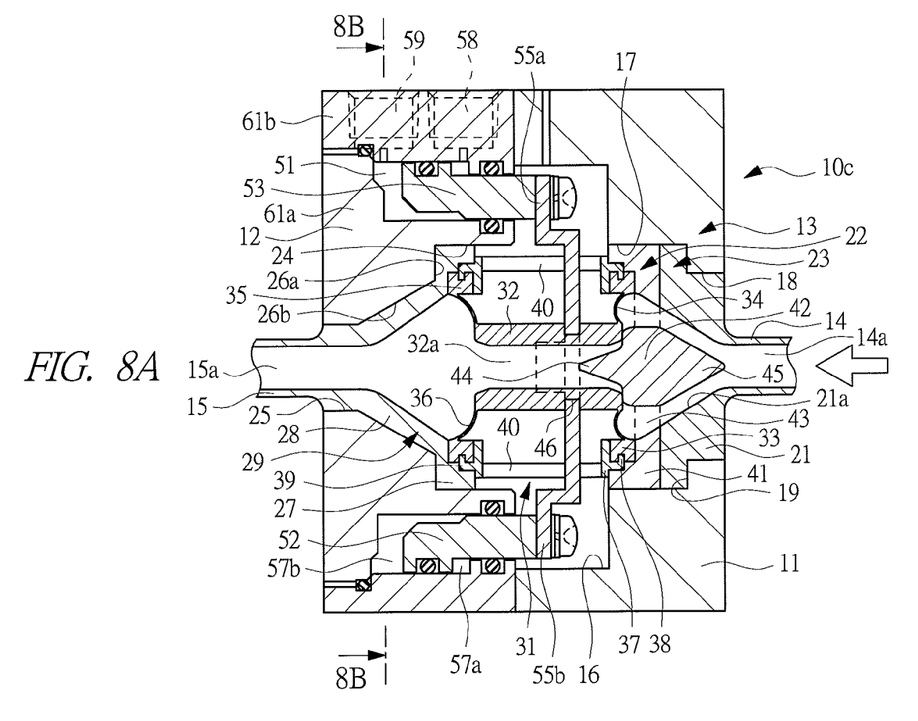
FIG. 8A is a longitudinal sectional view showing a diaphragm valve according to still another embodiment of the present invention.
Figure 8B:
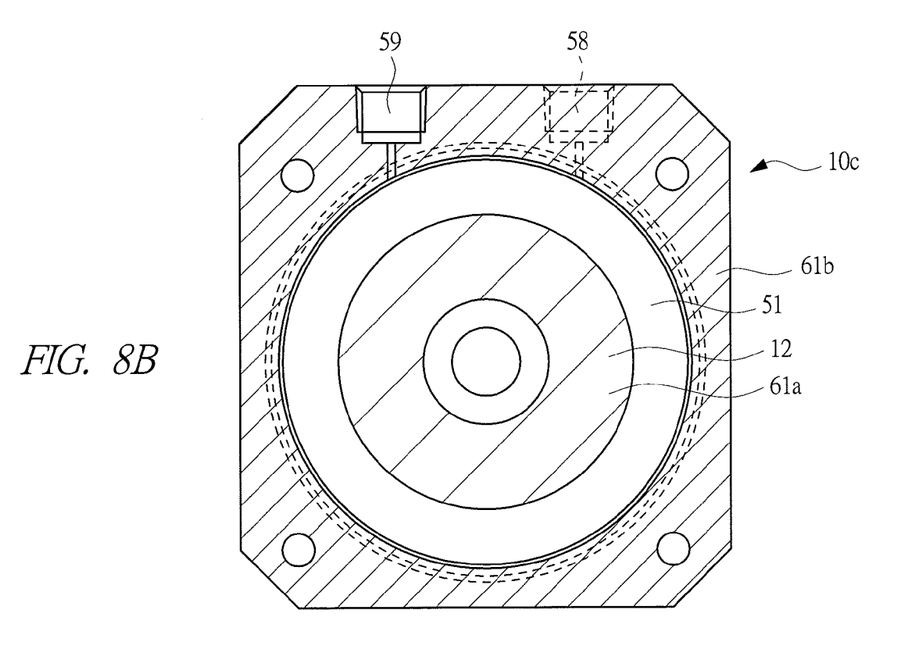
FIG. 8B is a cross sectional view taken along a line 8B-8B in FIG. 8A.

FIGS. 8A and 8B are sectional views showing a diaphragm valve 10c according to still another embodiment of the present invention. This diaphragm valve 10c is different from the above described diaphragm valve 10a in driving mechanism for applying thrust to the hollow valve body 32, but it is the same as the diaphragm valve 10a regarding the remaining structure.

In this diaphragm valve 10c, the second housing body 12 is composed of an inner portion 61a and a cylindrical outer portion 61b attached to the outside of the inner portion 61a, and an annular piston 52 is assembled in a cylinder chamber 51 formed between these portions 61a and 61b. A cylindrical piston rod 53 is provided to the annular piston 52 as a reciprocating member, and this piston rod 53 is coupled to the hollow valve body 32 by coupling members 55a and 55b. A pressure chamber 57a for backward movement formed in the housing body 12 communicates with a charging/discharging port 58 and a pressure chamber 57b for forward movement communicates with a charging/discharging port 59. Although the annular piston 52 is a double-acting type piston, it may be a single-acting type piston, as described above.

Figure 9A:
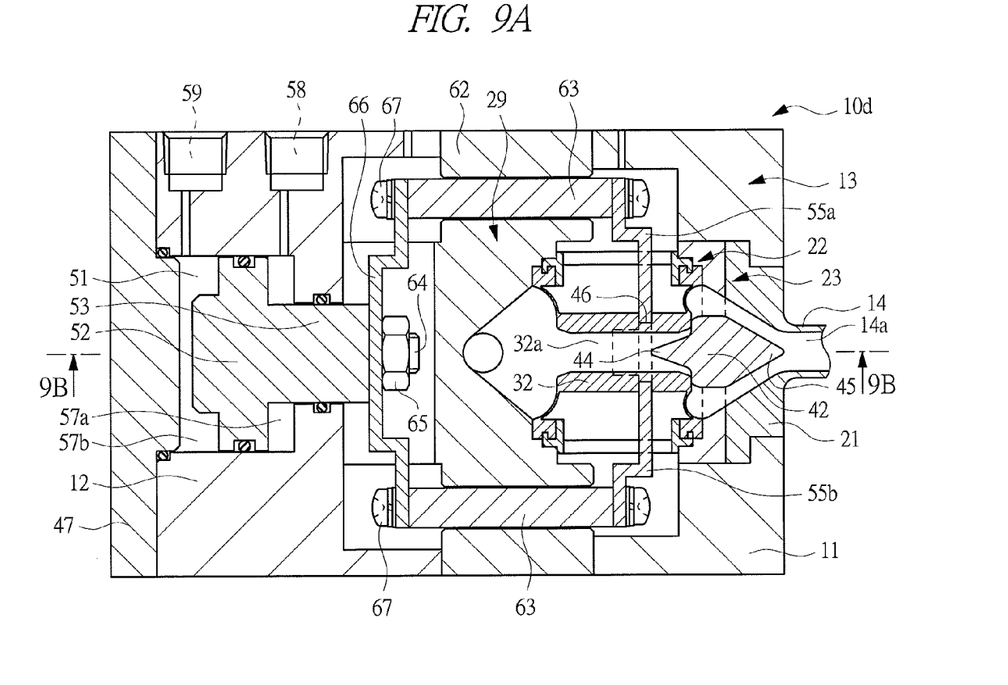
FIG. 9A is a cross sectional view showing a diaphragm valve according to yet another embodiment of the present invention.
Figure 9B:
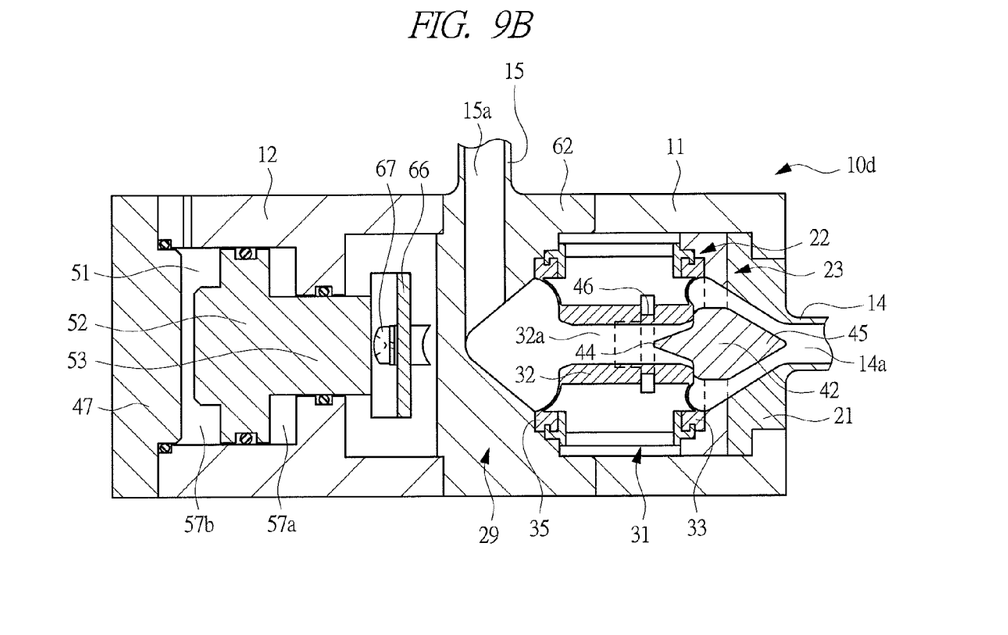
FIG. 9B is a sectional view taken along a line 9-9 in FIG. 9A.

FIGS. 9A and 9B are sectional views showing a diaphragm valve 10d according to yet another embodiment of the present invention. A valve housing 13 of this diaphragm valve 10d has a joint block 62 disposed between the first housing body 11 and the second housing body 12, and this joint block 62 constitutes the second joint member 29. The second pipe 15 is integrally provided in the joint block 62, and the second pipe 15 is positioned at right angles to the first pipe 14. The second mounting portion 35 of the diaphragm unit 31 is fixed to the joint block 62 serving as the joint member 29, as shown in FIGS. 9A and 9B.

The cylinder chamber 51 is formed in the second housing body 12 in coaxial relationship with the hollow valve body 32, and covered with a cover 47. The piston 52 is mounted in the cylinder chamber 51 so as to be capable of performing a reciprocating motion in the axial direction. Two coupling rods 63 are mounted on the joint block 62 as reciprocating members so as to be capable of performing a reciprocating motion in the axial direction. A male screw portion 64 is provided to the piston rod 53 provided on the piston 52, and a coupling member 66 is mounted to the piston rod 53 with a nut 65 which is joined to this male screw portion 64. This coupling member 66 is mounted to the coupling rods 63 by screw members 67. From charging/discharging ports 58 and 59 formed in the second housing body 12, compressed air is supplied to the pressure chamber 57b for forward movement and the pressure chamber 57a for backward movement defined in the cylinder chamber 51 by the piston 52. Therefore, in the diaphragm valve 10d shown in FIGS. 9A and 9B, the axial direction thrust is applied to the hollow valve body 32 via the coupling rod 63 by one piston 52, so that it switches between the state where the flow path 14a of the first pipe 14 and the flow path 15a of the second pipe 15 communicate with each other and the state where this communication is blocked.

Figure 10A:
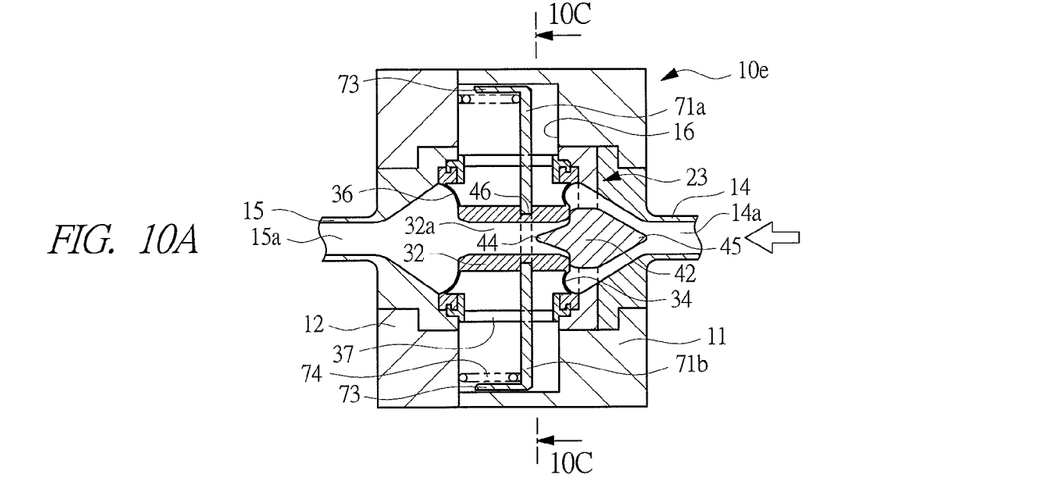
FIG. 10A is a sectional view showing a closed state of a flow path in a diaphragm valve according to further embodiment of the present invention.
Figure 10B:
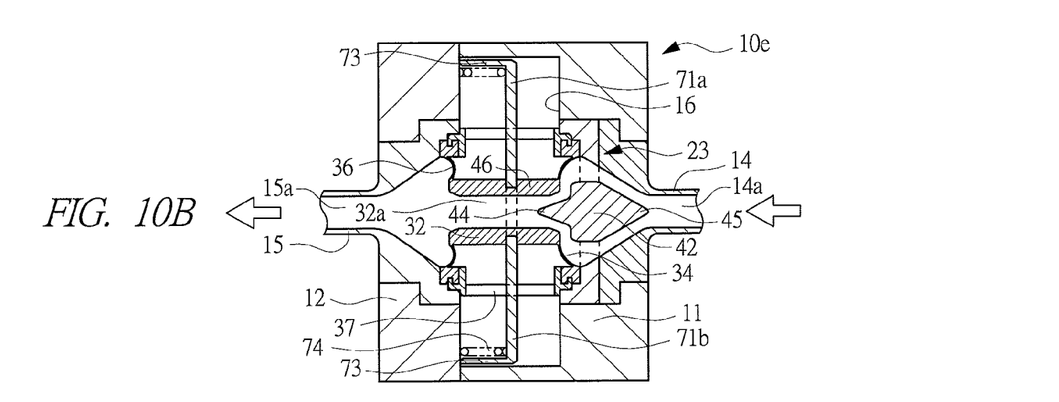
FIG. 10B is a sectional view showing an opened state of its flow path.
Figure 10C:
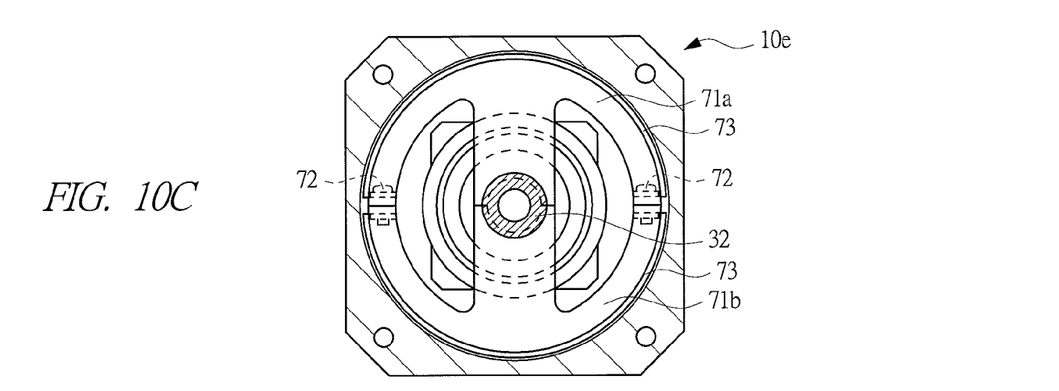
FIG. 10C is a sectional view taken along a line 10C-10C in FIG. 10A.

FIGS. 10A to 10C are sectional views showing a diaphragm valve 10e according to further embodiment of the present invention. The diaphragm valve 10e is a non-return valve, namely, a check valve which allows fluid to flow from the flow path 14a of the first pipe 14 to the flow path 15a of the second pipe 15, and blocks fluid from flowing in the reverse direction.

The structures of the case 37 and a diaphragm unit 31 assembled therein are the same as those shown in FIGS. 1A and 1B, and the driving mechanism shown in FIGS. 1A and 1B is not provided in the second housing body 12. A coupling member 71a engaged with an approximately half-arc portion of the annular groove 46 formed on an outer peripheral face of the hollow valve body 32 and a coupling member 71b engaged with the remaining approximately half-arc portion of the annular groove 46 are assembled in the receiving concave portion 16 formed in the first housing body 11. As shown in FIG. 10C, the coupling members 71a and 71b are coupled to each other with screw members 72. The respective coupling members 71a and 71b are integrally provided with semi-circular cylindrical portions 73, respectively, and a cylindrical portion is formed of the cylindrical portions 73 by fastening the coupling members 71a and 71b with the screw members 72. A compression coil spring 74 which is a spring member is attached in the cylindrical portions 73 as a biasing member, so that biasing force directed toward the valve seat portion 42 is applied to the hollow valve body 32 by the compression coil spring 74.

Since the spring force directed toward the valve seat portion 42 is applied to the hollow valve body 32 in this manner, a closing direction thrust as the sum of a thrust due to pressure of fluid applied to the diaphragm 36 and a thrust due to the spring force is applied to the hollow valve body 32. Therefore, when the opening direction thrust applied to the diaphragm 34 by the fluid in the first flow path 14a becomes larger than the closing direction thrust applied to the diaphragm 36 in the reverse direction, the hollow valve body 32 is separated from the valve seat portion 42, so that such an opened state is achieved that the communication flow path 32a communicates with the flow path 14a. On the other hand, when the opening direction thrust is smaller than the closing direction thrust, the hollow valve body 32 abuts on the valve seat portion 42 so that the communication flow path 32a is closed. Thus, the diaphragm valve 10e shown in FIGS. 10A to 10C constitutes a non-return valve which allows flow from the flow path 14a to the flow path 15a and blocks flow in the reverse direction. A stroke of separation of the hollow valve body 32 from the valve seat portion 42 is restricted by abutting of the cylindrical portions 73 on the end face of the second housing body 12.

Figure 11A:
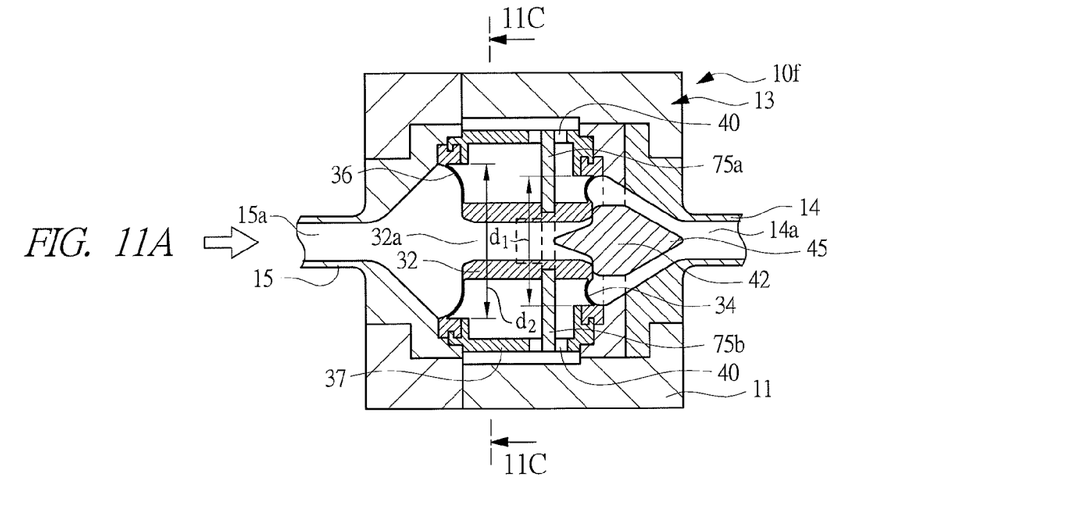
FIG. 11A is a sectional view showing a closed state of a flow path in a diaphragm valve according to still further embodiment of the present invention.
Figure 11B:
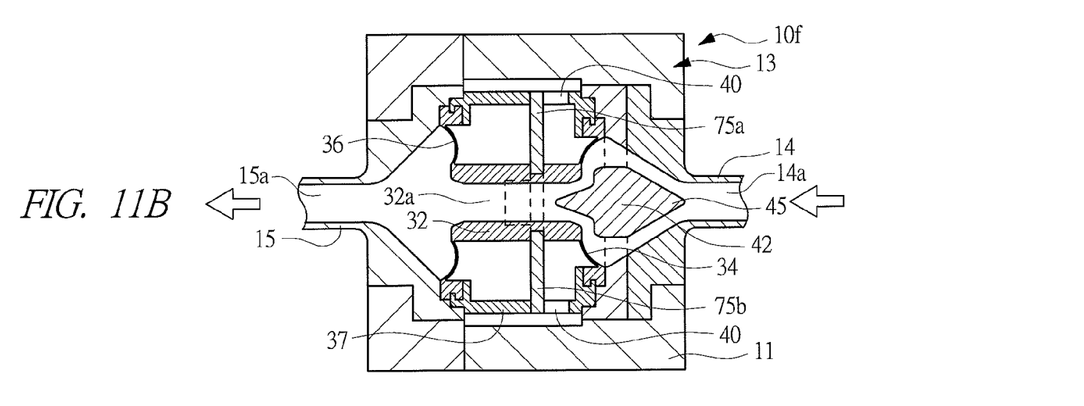
FIG. 11B is a sectional view showing an opened state of its flow path.
Figure 11C:
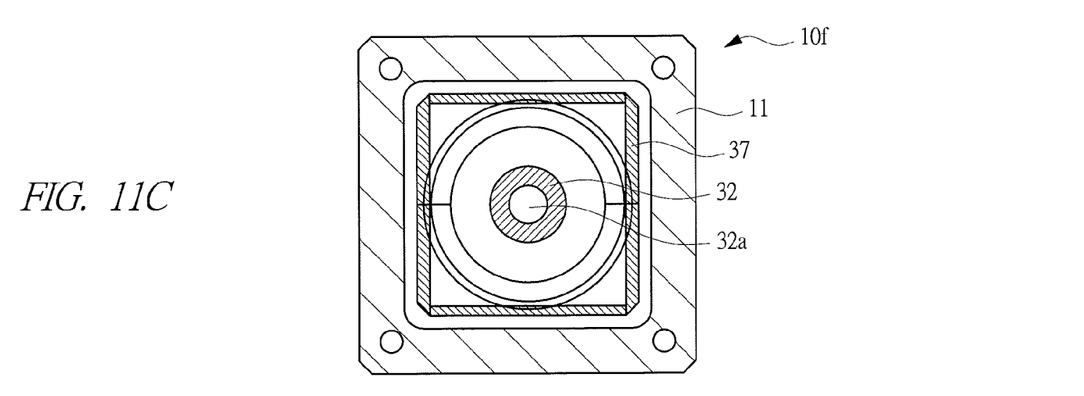
FIG. 11C is a sectional view taken along a line 11C-11C in FIG. 11A.

FIGS. 11A to 11C are sectional views showing a diaphragm valve 10f according to still further embodiment of the present invention. This diaphragm valve 10f is a non-return valve which allows fluid to flow from the flow path 14a of the first pipe 14 to the flow path 15a of the second pipe 15 and blocks fluid from flowing in the reverse direction as well as the above described diaphragm valve 10e. However, the compression coil spring 74 shown in FIGS. 10A and 10B is not provided in this diaphragm valve 10f, so that the spring force in the closing direction toward the valve seat portion 42 is not applied to the hollow valve body 32.

In the diaphragm valve 10f shown in FIGS. 11A to 11C, the outer diameter d2 of the second diaphragm 36 is set to be larger than the outer diameter d1 of the first diaphragm 34. In the diaphragm valve 10f shown in FIGS. 11A to 11C, therefore, when the pressure of fluid in the flow path 14a becomes higher than the pressure of fluid in the flow path 15a, the opening direction thrust to the hollow valve body 32 exerted by fluid in the flow path 14a applied to the first diaphragm 34 becomes larger than the closing direction thrust exerted by fluid in the flow path 15a applied to the diaphragm 36, so that the hollow valve body 32 is separated from the valve seat portion 42 to open the communication flow path 32a. On the contrary, when the opening direction thrust is smaller than the closing direction thrust, the hollow valve body 32 abuts on the valve seat portion 42 so that the communication flow path 32a is closed. Thus, the diaphragm valve 10f shown in FIGS. 11A to 11C is a non-return valve which allows flow from the flow path 14a to the flow path 15a and blocks flow in the reverse direction thereto like the diaphragm valve 10e.

Two guide members 75a and 75b are attached to the hollow valve body 32 and engaged with the annular groove 46, in order to restrict the moving distance of the hollow valve body 32 from the valve seat portion 42 and movement of the hollow valve body 32 in the axial direction is guided by two guide members 75a and 75b, the respective guide members 75a and 75b move along the opening portions 40 of the case 37.

The present invention is not limited to the above-described embodiments but it may be modified variously within a scope which does not departing from the gist of the present invention. For example, in the diaphragm valve illustrated, the flange portion 21 integrally provided together with the pipe 14 is constituted as the joint member 23, but a joint member separated from the pipe 14 may be provided on the valve housing 13. The same holds true for the second joint member 29. Furthermore, as the driving means adapted to reciprocate the hollow valve body 32 in the axial direction, the piston is used in the above-described embodiments, where the piston is driven by compressed air or the pressurized liquid, but it may be driven by an electric motor, and it may be driven manually.

INDUSTRIAL APPLICABILITY

The diaphragm valve of the present invention is used for opening/closing a fluid flow path which guides fluid discharged from a pump to a fluid-discharging portion such as a nozzle or preventing reverse flow of fluid.

What is claimed is:
1. A diaphragm valve in which a valve body having a diaphragm is incorporated into a valve housing, and which performs opening and closing operations to switch between a state where a first flow path communicates with a second flow path and a state where the first flow path is blocked from communicating with the second flow path, the diaphragm valve comprising:

a hollow valve body which is disposed so as to be capable of performing a reciprocating operation in an axial direction in the valve housing and which is formed with a communication flow path through which the first flow path and the second flow path communicate with each other;

a first diaphragm which is provided to one end portion of the hollow valve body, the first diaphragm having a first mounting portion;

a second diaphragm which is provided to the other end of the hollow valve body and moved in synchronization with the first diaphragm via the hollow valve body, the second diaphragm having a second mounting portion, wherein the first diaphragm, the second diaphragm and the hollow valve body collectively constitute a diaphragm unit;

a case in which the diaphragm unit is accommodated, the case engaging with the first mounting portion of the first diaphragm and the second mounting portion of the second diaphragm so as to keep a distance between the first and second mounting portions constant; and a reciprocating member which is provided to the valve housing and reciprocably movable in the axial direction and coupled with hollow valve body, wherein when the hollow valve body is moved by the reciprocating member in a direction parallel to a moving direction of the reciprocating member, the hollow valve body abuts on a valve seat portion provided to the valve housing to close the communication flow path.

2. The diaphragm valve according to claim 1, wherein a valve seat block having the valve seat portion is provided to the valve housing.

3. The diaphragm valve according to claim 1, wherein concave surfaces of the first and second diaphragms are directed outwardly in the axial direction of the hollow valve body, and of the first and second diaphragms to have opposite relationship with each other in concavity and convexity.

4. The diaphragm valve according to claim 1, wherein the reciprocating member is a piston rod provided to a piston which is driven by a fluid pressure, and the piston is mounted in a cylinder chamber separated from a concave portion in which the diaphragm unit is accommodated.

5. The diaphragm valve according to claim 4, wherein the piston is a single-acting type piston.

6. The diaphragm valve according to claim 4, wherein the piston rod is formed into a cylindrical shape, and the piston is formed into an annular shape.

7. The diaphragm valve according to claim 1, wherein a biasing member which applies biasing force in a direction toward the valve seat portion is provided to the hollow valve body, when an opening direction thrust applied to the first diaphragm by fluid in the first flow path is larger than a closing direction thrust as the sum of a biasing force of the biasing member and a thrust applied to the second diaphragm by the pressure of fluid in the second flow path, the hollow valve body is separated from the valve seat portion to open the communication flow path, and when the opening direction thrust is smaller than the closing direction thrust, the hollow valve body abuts on the valve seat portion to close the communication flow path.

8. A diaphragm valve in which a valve body having a diaphragm is incorporated into a valve housing, and which performs opening and closing operations to switch between a state where a first flow path communicates with a second flow path and a state where a first flow path is blocked from communicating with a second flow path, the diaphragm valve comprising:

a hollow valve body which is disposed so as to be reciprocally movable in an axial direction in the valve housing, and which is formed with a communication flow path through which the first flow path and the second flow path communicate with each other;

a first diaphragm which is provided to one end portion of the hollow valve body;

a second diaphragm which is provided to the other end of the hollow valve body and moved in synchronization with the first diaphragm via the hollow valve body;

a valve seat block which has a first conical projection projecting into the communication flow path and a second conical projection projecting into the first flow path, and which is provided to the valve housing;

a guide member which is attached to the hollow valve body; and a case which is accommodated in the valve housing, and which guides movement of the hollow valve body in the axial direction by guiding movement of the guide member, wherein an outer diameter of the second diaphragm is set to be larger than an outer diameter of the first diaphragm, when an opening direction thrust applied to the first diaphragm by fluid in the first flow path is larger than a closing direction thrust applied to the second diaphragm by fluid in the second flow path, the hollow valve body is separated from the valve seat portion to open the communication flow path, and when the opening direction thrust is smaller than the closing direction thrust, the hollow valve body abuts on the valve seat portion to close the communication flow path.

\* \* \* \* \*